(12) United States Patent
McMahon et al.

(10) Patent No.: US 6,532,140 B1
(45) Date of Patent: Mar. 11, 2003

(54) ARC-FAULT DETECTING CIRCUIT BREAKER SYSTEM

(75) Inventors: Roy P. McMahon, Indianapolis, IN (US); John R. Archer, Indianapolis, IN (US)

(73) Assignee: Raytheon Company, Lexington, MA (US)

( * ) Notice: Subject to any disclaimer, the term of this patent is extended or adjusted under 35 U.S.C. 154(b) by 46 days.

(21) Appl. No.: 09/585,600

(22) Filed: Jun. 2, 2000

(51) Int. Cl.[7] .............................. H02H 9/00; H02H 1/00
(52) U.S. Cl. .............................. 361/54; 361/56; 361/107
(58) Field of Search .............................. 361/54, 56, 42, 361/44, 93.1, 93.8, 100, 93.9, 99, 10, 107, 113

(56) References Cited

U.S. PATENT DOCUMENTS

| | | | |
|---|---|---|---|
| 4,822,983 A | * | 4/1989 | Bremner et al. ............ 219/505 |
| 5,208,542 A | | 5/1993 | Tennies |
| 5,224,006 A | * | 6/1993 | MacKenzie et al. ......... 361/45 |
| 5,510,946 A | | 4/1996 | Franklin |
| 5,691,869 A | | 11/1997 | Engel |
| 5,706,154 A | | 1/1998 | Seymour |
| 5,805,397 A | | 9/1998 | MacKenzie |
| 5,815,352 A | | 9/1998 | MacKenzie |
| 5,818,671 A | | 10/1998 | Seymour |
| 5,889,643 A | | 3/1999 | Elms |
| 5,940,256 A | | 8/1999 | MacKenzie |
| 5,963,405 A | | 10/1999 | Engel |
| 5,966,281 A | * | 10/1999 | Larson ....................... 361/103 |
| 5,982,593 A | | 11/1999 | Kimblin |
| 6,014,297 A | | 1/2000 | Clarey |
| 6,057,997 A | | 5/2000 | MacKenzie |
| 6,198,611 B1 | * | 3/2001 | Macbeth ..................... 361/42 |
| 6,259,996 B1 | | 7/2001 | Haun |

FOREIGN PATENT DOCUMENTS

| | | |
|---|---|---|
| EP | 0 510 795 A2 | 10/1992 |
| WO | WO 00/08663 | 2/2000 |

* cited by examiner

*Primary Examiner*—Kim Huynh
(74) *Attorney, Agent, or Firm*—William C. Schubert; Glenn H. Lenzen, Jr.

(57) ABSTRACT

An arc-fault detecting circuit-breaker system includes a normally closed line circuit breaker in series with a protected electrical circuit element whose current flow is to be interrupted upon the occurrence of an arc fault. A detector senses the rate of change with time of the current flow in the protected electrical circuit element. A silicon-controlled rectifier has a gate of the silicon-controlled rectifier in electrical communication with a detector output signal of the detector. The silicon-controlled rectifier shorts the current flow in the protected electrical circuit element in the event that the detector output signals that the rate of change of current with time in the protected electrical circuit element is in excess of a permitted maximum rate-of-change value, thereby activating the line circuit breaker.

18 Claims, 2 Drawing Sheets

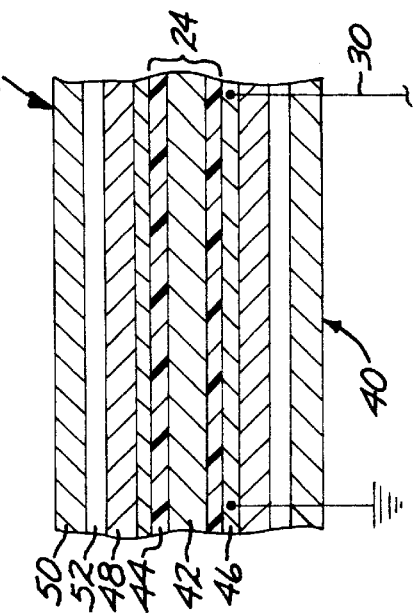
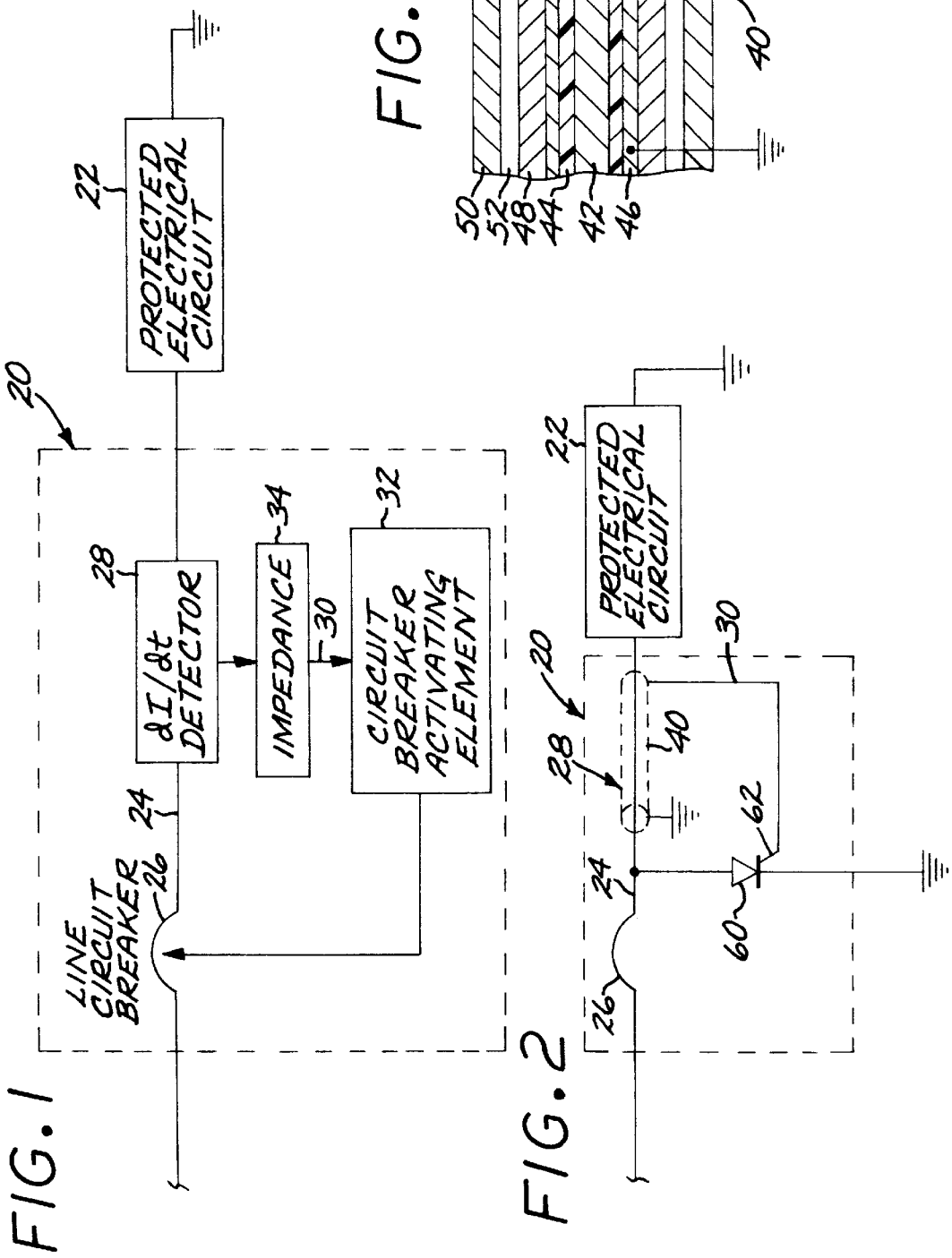

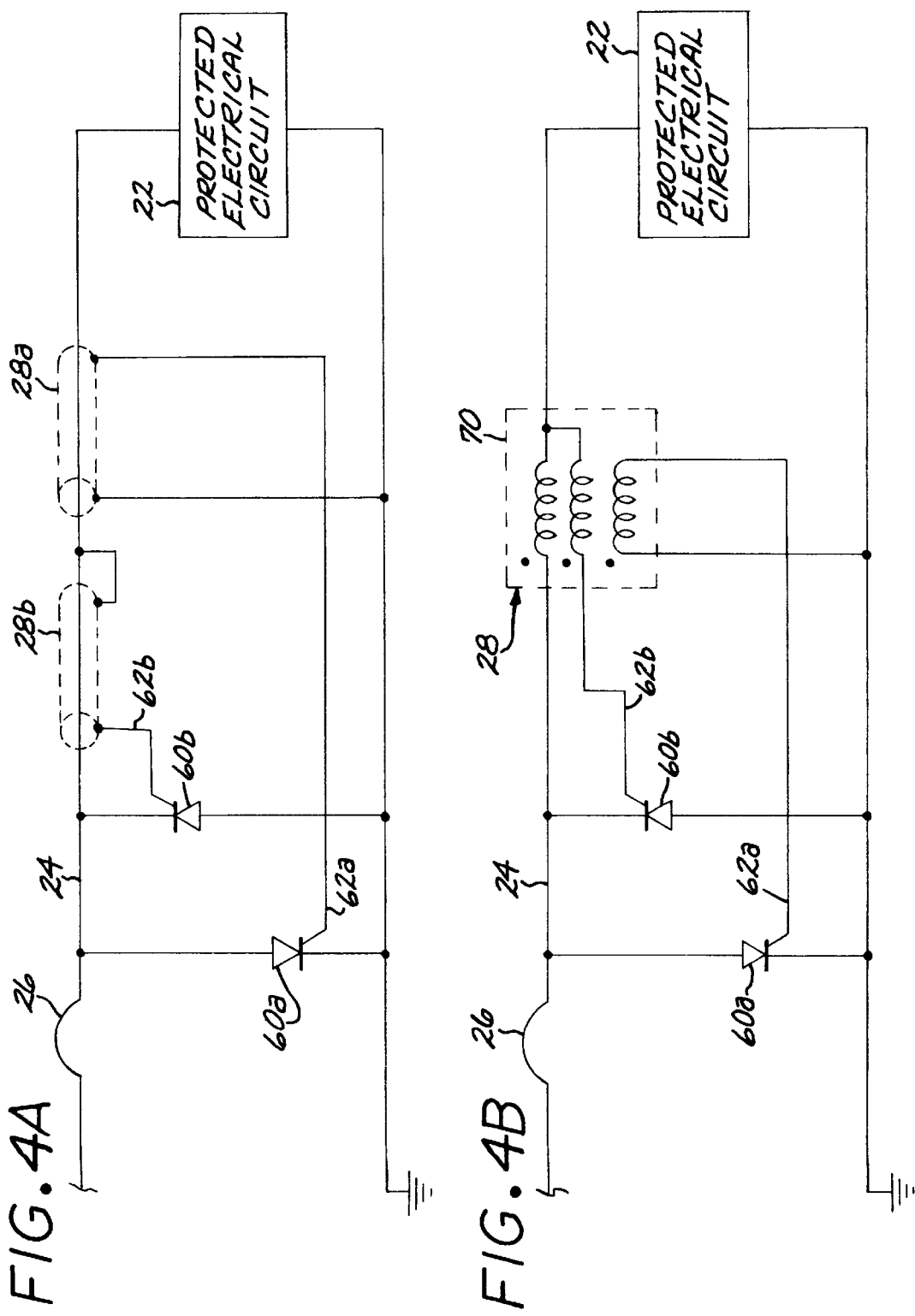

ARC-FAULT DETECTING CIRCUIT BREAKER SYSTEM

BACKGROUND OF THE INVENTION

This invention relates to circuit breaker systems and, more particularly, to an arc-fault detecting circuit-breaker system responsive to the occurrence of arcing in a protected electrical circuit.

Aircraft electrical systems are normally protected from high current and electrical shorts by circuit breaker devices. These circuit breakers are designed to remove power from a protected electrical circuit element if an electrical current above a preset value is passed through the device. These high currents may occur for a number of reasons, such as a failure occurring in a piece of electrical equipment or damage occurring in a section of wiring insulation allowing the conductor to come into electrical contact with the structure of the aircraft, which is normally at ground potential.

Due to the nature of the circuit breaker mechanism, the tripping of the circuit breaker is not always "instantaneous". Some types of circuit breakers are allowed to continue supplying current for up to 40 seconds at twice their specified trip current. An overload of five times the rated current is allowed to flow for up to three seconds before a trip must occur. These trip delays are allowed because these devices rely on the overcurrent to heat up a bimetallic strip that functions as the detection element within the circuit breaker.

Circuit breakers conforming to these requirements have been used in aircraft for many years. Under normal operating conditions and under normal fault conditions, they operate satisfactorily. However, there are some fault conditions where the tripping delay greatly affects the ability of the circuit breaker to protect life and property. For example, certain types of wiring failures allow for a fault to ground which is not a "dead short", meaning a direct, virtually zero-resistance electrical connection to ground. Certain types of wiring insulations arc track when electrically faulted, which locally turns the material from an insulator to a conductor. An arc-tracked wire can be shorted to ground through a resistance which serves as a current limiter, which in turn allows the current to flow through the wire to the fault for some time until the circuit breaker is tripped. Until that occurs, the high current flow can damage and arc track other wires, adding their electrical supplies into the fault. This fault may initiate a cascading chain reaction which quickly compromises the safety of the aircraft.

These types of events occur sufficiently often in aircraft wiring systems that there is a need for a device which can detect arcing faults and remove electrical power from the protected electrical circuit element more quickly than can a standard circuit breaker. In addition, such a device must meet other requirements, such as space limitations, low cost, and "invisibility" to normal operating conditions of aircraft electrical systems. The present invention fulfills this need, and further provides related advantages.

SUMMARY OF THE INVENTION

The present invention provides an arc-fault detecting circuit-breaker system and a method for its use. The arc-fault detecting circuit-breaker system responds both to excessive currents, as does a conventional circuit breaker, and to arc faults (sometimes termed "sparks"). These overcurrent and arc-fault-responsive functions are combined into a single arc-fault detecting circuit-breaker element that allows normal functioning of a protected electrical circuit element under ordinary operating circumstances, but responds instantaneously when a fault occurs. It may be used in circumstances where conventional circuit breakers are now used, but adds the additional capability of arc-fault detection. The arc-fault detecting circuit-breaker system is highly reliable, but fails to a safe state if failure should occur. It is light in weight and small in volume, may be packaged in a manner similar to that of conventional circuit breakers, and is relatively inexpensive. It does not affect the normal operations of the protected electrical circuit element.

In accordance with the invention, an arc-fault detecting circuit-breaker system comprises a normally closed line circuit breaker in series with a protected electrical circuit element (including an electrical load and the wiring line leading to it) whose current flow is to be interrupted upon the occurrence of an overcurrent condition or an arc fault. It further includes a detector of the rate of change with time of the current flow in the protected electrical circuit element, and a circuit-breaker activating (tripping) element operable responsive to the detector. The circuit-breaker activating (tripping) element opens the circuit breaker in the event that the detector detects a rate of change of current with time in the protected electrical circuit element in excess of a permitted maximum rate-of-change value.

The line circuit breaker is preferably a resettable circuit breaker, but it may be a one-shot fuse circuit breaker.

The circuit-breaker activating (tripping) element preferably includes a silicon-controlled rectifier (SCR) and, optionally, a resistor in the SCR gate circuit. Arc-fault detecting circuit breaker systems used in direct current (DC) applications may be made with a single SCR. Arc-fault detecting circuit breaker systems for alternating current (AC) applications use two SCRs to operate with the reversing voltage potential. An arc-fault detecting circuit breaker system built for AC applications will operate properly in DC applications as well.

For the DC application, the SCR is connected from the line to ground. For the AC application, the second SCR is connected in opposite polarity from the line to ground. Whether in AC or DC operation and whether the circuits have return wires or are locally grounded, the SCRs carry current from the line to ground (or vice versa) when activated. This type of connection, termed a "crowbar" circuit, causes a large current to flow through the normal current-limiting line circuit breaker. The line circuit breaker activates or "trips", halting the flow of current through the line circuit breaker and therefore also to the load. In addition, the SCR(s), by providing a low-resistance path to ground compared to the line or line fault, virtually instantaneously stops the flow of current to the fault which initiated the event, limiting further damage.

The arc-fault detector triggers the operation of the SCR (s). The detector may have various forms. It may be either magnetically saturable or non-saturable in design and operation.

In one form, the detector comprises a conductive shield (such as a braided copper wire) which surrounds the electrical line that forms part of the protected electrical circuit. This structure may in turn be contained within a magnetically permeable tube that can be saturable. This construction has a natural built-in air gap for handling direct currents and provides a low inductance for reduced sensitivity to normal circuit variations that might induce false triggers. Low inductance and sensitivity make this form of the detector particularly useful for high DC current circuits.

A second type of small, magnetically efficient detector may be constructed using ferrite pot-cores of nickel-based magnetic materials which saturate readily. This small size makes it easy to incorporate the detector into a circuit breaker package. Continuous currents of 20 to 30 amperes may be handled with a small resistive loss.

The primary inductance of the detector is small. Only abnormally large low-frequency transients or optimally faster, low-current arcing events will trigger the SCRs. These low-value arcing currents occur as an addition to normal primary current and force the detector's inductor core toward saturation. A saturable reactor produces voltage pulses (LdI/dt) of opposite polarity as its locus of operation enters and leaves the region of core saturation. A large fault current holds the core in saturation for a large fraction of a fault-event time. This behavior implies a short duty cycle, with increasing inductance, as the fault current decreases. There is therefore a large back emf (trigger pulse). There is similarly a short duty cycle going into saturation. This can have the effect of charging the SCR gate capacitance sufficiently to keep the device in a conduction mode when its anode voltage is cyclically removed. The SCR devices chosen for this application are preferably constructed with internal shorts such that the anode and gate voltages during conduction, with respect to the cathode, are almost equal.

All nominally identical semiconductor devices have a variation or spread of operating parameters. The circuit-breaker activating elements may be made to function more identically in respect to external circuitry if appropriate series current feedback is used. In this application, an impedance (series resistor) may be inserted into the gate drive line. The series resistor has a value of several times the effective gate dynamic resistance at the trigger point. The price of this feedback is a larger applied drive voltage from the detector. Larger values of series resistor lower the sensitivity of the circuit. If the sensitivity is too high, then triggering may occur with a normal power-up or breaker re-set.

The present arc-fault detecting circuit-breaker system is operable to detect both conventional overcurrent conditions and also arcing conditions, and to interrupt the circuit of the protected electrical circuit element upon the occurrence of either type of condition. In the case of an arcing condition, the system interrupts the circuit much more quickly than would a conventional circuit breaker. The sensitivity of the detector is set such that normally expected electrical transients, such as startup voltage spikes and motor startup loads, do not trigger the SCR(s). The device will not misinterpret these conditions as arcing events, and trip the breaker and remove power from some system inadvertently. The latter is an important consideration for aircraft operations.

Surge currents and power supply switch-on transients may cause substantial transients in a circuit yet still be normal in such applications, see MIL-STD-704. These currents may have large peak values but are generally bounded by an upper frequency limit close to 1000 Hz (Hertz). The arc-fault detecting circuit breaker of the invention desirably operates with very small values of inductance, typically less than 100 microHenrys, so that its responsiveness is greatly diminished at frequencies on the order of 1000 Hz and below. The present approach has a normal circuit breaker element in series in the protected circuit, which is designed to accept and not respond to such transients. Thus, the present invention does not trigger when exposed to normal surges and transients in current.

The arc-fault detecting circuit-breaker system is operable to detect current changes that are smaller than the normal operating current, such as a beginning arc at the end of a long wiring harness. This capability has great significance for 400 Hz operation, such as found in many aircraft electrical systems, where wiring impedance due to the length of the wiring harness may naturally limit fault current flow even though an arcing event (or even a fire) is in progress.

In its preferred embodiments, the arc-fault detecting circuit-breaker system is light in weight and relatively inexpensive, so that it may be used to protect many circuits in aircraft flight applications where weight is an important consideration. It is also small in size, so that it may be used in new circuits, or retrofitted into existing circuits, without exceeding space constraints. The small size also permits it to be packaged into about the same package size as conventional line circuit breakers. The arc-fault circuit breaker system of the invention may be configured as an add-on supplement to an existing circuit breaker if replacement of the circuit breaker is not possible. The detector or even all of the device other than the circuit breaker itself may be remote from the circuit breaker, such as at the end of a long wiring harness.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic circuit diagram of an arc-fault detecting circuit-breaker system;

FIG. 2 is a schematic circuit diagram of a preferred form of the arc-fault detecting circuit-breaker system for use with DC circuits;

FIG. 3 is a schematic depiction of a preferred form of the detector; and

FIGS. 4A–B are a schematic circuit diagram of preferred forms of the arc-fault detecting circuit-breaker system for use with AC circuits, wherein FIG. 4A depicts a coaxially coupled approach and FIG. 4B depicts a transformer-coupled approach.

DETAILED DESCRIPTION OF THE INVENTION

FIG. 1 is a schematic diagram of an arc-fault detecting circuit-breaker system 20, which serves to protect a protected electrical circuit 22 against overcurrents (excessively high currents) and arc faults. The arc-fault detecting circuit-breaker system 20 is illustrated in series with the protected electrical circuit 22 through an electrical line 24.

The arc-fault detecting circuit-breaker system 20 includes a line circuit breaker 26, which may be a resettable circuit breaker or a one-shot fuse. The line circuit breaker 26 is a normally closed component sized to allow current flow therethrough up to some selected maximum current, and then to fail in the event that a higher current is passed therethrough. A conventional resettable circuit breaker or one-shot fuse is used as the line circuit breaker 26, in conjunction with additional circuitry as described subsequently. The line circuit breaker 26 functions to interrupt current flow in the electrical line 24 under selected conditions. One of the conditions is the occurrence of an excessively high electrical current through the electrical line 24.

The other of the conditions is the occurrence of an arc fault, sometimes called a sparking condition, which activates (opens or trips) the line circuit breaker by the following approach.

The occurrence of the arc-fault is sensed by a detector 28 which measures the rate of change of electrical current I in the electrical line 24 as a function of time t, or dI/dt. An output signal 30 of the detector 28 is supplied to a circuit breaker activating element 32, which causes the circuit breaker 26 to be opened and the currents flow through the circuit breaker 26 to be interrupted in the event that the output signal 30 indicates a rate of change of current flow, dI/dt, greater than a permitted maximum rate-of-change value.

With this approach, the line circuit breaker 26 is responsive to both excessive currents and excessive rates of change of electrical current with time. The detector 28 acts as a low-pass filter. It responds to fast transients of sufficient amplitude which may have such a small heating value that the standard circuit breaker element cannot respond to them. Slow rising, low-amplitude events are ignored by the detector 28 and are sensed by the line circuit breaker 26.

The mutual impedance of the detector 28 transfers power, with a suitable wave shape, to the circuit breaker activating element 32. This power may be larger than that required to trigger the circuit breaker activating element 32. An impedance 34, such as a resistor, may optionally be inserted into the line carrying the output signal 30 to act as a sensitivity, trigger point, or device operation equalization control, because the series impedance tends to offset the characteristic variations in the input of the activating element 32. This optional impedance 34 is omitted from the diagrams of FIGS. 2 and 4A–B, with the understanding that it may be added into the output signal 30 if desired to vary the sensitivity of the triggering.

The present approach is distinctly different from an alternative view of the detection of arc faults, which alternative view is not acceptable in the present approach, and which uses the current in the electrical line as an indicator of the presence of an arc fault. This view is based on the observation that an arc fault is usually accompanied by a brief current spike in the electrical line. However, other events, such as a motor startup, may also produce a brief current spike. The arc-fault detecting circuit-breaker system of the invention cannot afford to misinterpret a motor startup or similar normal events as the presence of an arc fault, because it cannot be allowed to wrongly shut down a complex system, such as an aircraft electrical system, at a critical time. The present technique eliminates false detections and trips, which cannot be tolerated in aircraft, spacecraft, and similar systems.

The present approach is based on the observation that the current spike associated with an arc fault is different from the current spike associated with more-normal events in the electrical system. In particular, the current spike associated with the arc fault has a higher rate of increase of electrical current with time (i.e., a more rapid rise in the leading edge of the spike), as compared with the rate of increase of electrical current with time associated with more-normal events. The discrimination value, which is the permitted maximum rate-of-change value utilized by the circuit breaker activating element, is selected for each protected electrical circuit to distinguish normal events that might be associated with that protected electrical circuit.

There may be hundreds of electrical systems that may require protection in a complex system such as an aircraft. An objective of the present invention is to implement the arc-fault detecting circuit-breaker system for all or at least many of the candidate electrical systems. The preferred arc-fault detecting circuit-breaker system is therefore light in weight, small in size, and relatively inexpensive so that the arc-fault detecting circuit-breaker systems do not collectively add excessive amounts of weight, volume requirement, or cost to the system. FIG. 2 depicts a preferred embodiment for the case where a DC current flows in the electrical line 24, and FIGS. 4–B depict a preferred embodiment for the case where an AC current flows in the electrical line 24 (although the AC embodiment of FIGS. 4–B may also be used for DC current flows as well).

The detector 28 in both the embodiment of FIG. 2 and the embodiment of FIG. 4A is shown as a flux-based dI/dt sensor 40, which is illustrated more fully in FIG. 3. The dI/dt sensor 40 is built around the electrical line 24, which includes a conductor 42 and its insulation 44, and does not require tapping into the electrical line 24. A sensing shield 46, preferably made of braided copper wires, overlies the insulation 44. One end of the sensing shield 46 is grounded, and the other end is sensed as the output signal 30. When a current change occurs in the conductor 42, there is a corresponding current produced in the sensing shield 46 by magnetic coupling, which is dependent upon the rate of change of the current flow in the conductor 42 with time, dI/dt. A layer of cable insulation 48 overlies the sensing shield 46. An optional outer housing 50 of a magnetically permeable material overlies the cable insulation 48 and is separated therefrom by an intervening air gap 52. The outer housing 50 physically protects the interior elements of the dI/dt sensor 40, and also serves to concentrate the magnetic flux produced by the current change in the conductor 42 to heighten the response in the sensing shield 46.

Ideally, the detector operates as a saturable reactor. More specifically, statically the operating point is positioned so that the core material working permeability is greater than unity. A change of circuit current flow in the detecting winding causes a core magnetic flux change. An opposing voltage tending to reduce the current change is induced across the winding. As core saturation is approached, the magnetic flux change and rate of change decrease and the induced voltage collapses, completing a voltage pulse. While the core is held in saturation (which may be for a large fraction of any operating cycle), the rate of change of core flux is minimal and no voltage is induced across the current carrying winding. As the current falls, a voltage of opposite polarity to that originally induced appears until a state of core saturation is reached again or the rate of change of current becomes insignificant. Each incursion into or exit from core saturation produces both a positive and a negative voltage change. If the original posited flux change is small, then a response voltage peak may not occur.

The coaxial approach of FIG. 3 provides both capacitive and magnetic coupling. As the magnetic permeability of the outer housing 50 is increased, the capacitive contribution becomes less important. That is, the detector 28 may be a coaxial set of conductors with all of their coupling properties or, with the outer housing 50 being a magnetic material, the magnetic coupling component is enhanced. The coaxial detector 28 may be approximated by a planar construction which has a built-in air path in the circuit formed of plates of permeable or non-permeable material with conductors between them. This path may be used to control inductance and/or to offset polarization of any magnetic material due to direct current flow. The planar form is topologically unchanged if it is rolled, folded, or overlapped. The planar form of the detector 28 may fit into or follow a surface contour of a circuit breaker housing or some other device in which it might be incorporated.

When there is a current change in the conductor 42 due to any reason, a voltage proportional to dI/dt in the conductor 42 is produced as the output signal 30. Under normal circumstances and normal operation of the protected electrical circuit 22, the value of dI/dt is small. In the event of an arc fault in the protected electrical circuit 22, the value of dI/dt is much larger, and will exceed the permitted maximum rate of change in the arc-fault detecting circuit-breaker system 20.

In a prototype dI/dt sensor 40 built by the inventors, the outer diameter of the outer housing 50 was 0.187 inches, and the length of sensing shield 46 between the ground and the output signal tap 30 was about 8 inches. The outer housing 50 was wound into a tight spiral to demonstrate its operability when reduced to a small size. The dI/dt sensor 40 is thus small in size and light in weight.

In the DC circuit of FIG. 2, the preferred circuit breaker activating element 32 is a semiconductor device 60 that has a gate input 62 (also sometimes called a "trigger"). The semiconductor device 60 functions as an open switch that normally maintains an open circuit between the electrical line 24 and ground, and there is no effect on the operation of the protected electrical circuit 22 or the line circuit breaker 26. In the event that the voltage in the detector output signal 30 exceeds the permitted maximum rate-of-change value applied to the gate input 62 (which is established by selection of the semiconductor device 60), the semiconductor device 60 functions as a closed switch, shorting the electrical line 24 to ground. The electrical current in the electrical line 24 increases as a result of the shorting to ground, exceeding the maximum permitted current of the line circuit breaker 26 so that it trips and opens, discontinuing the current flow in the electrical line 24.

The semiconductor device 60 is preferably a silicon-controlled rectifier (SCR) or its electrical equivalent. Such silicon-controlled rectifiers are available commercially in a wide range of sizes, current-carrying capabilities, and activating voltages for the gate input 62. The silicon-controlled rectifier has the characteristic that the short of the electrical line 24 to ground is maintained as long as the required voltage is applied to the gate input 62. After the required voltage is no longer applied, the current path of the electrical line 24 to ground through the silicon-controlled rectifier opens, so that the line circuit breaker 26 may reset (if a resettable device) and operation of the protected electrical circuit 22 may resume if the arc fault condition is no longer in effect.

In the arc-fault detecting circuit-breaker system as utilized with an AC circuit, the circuit breaker activating element 32 must be modified somewhat to account for the fact that there is current flow in opposite directions. The circuit breaker activating element 32 may still be based on the use of the semiconductor device 60 implemented as a silicon-controlled rectifier.

Referring to FIG. 4A, one form of an AC device uses two of the detectors 28a and 28b. A first detector 28a provides a gate input signal 62a to a semiconductor device 60a, which is preferably an SCR as discussed earlier. A second detector 28b provides a gate input signal 62b to a semiconductor device 60b, which is also an SCR. In this case, the detector 28 is in the ground return path of the semiconductor device 60b to eliminate any inter-winding voltage stress. This same configuration may be used in the DC device of FIG. 2 instead of the depicted arrangement.

FIG. 4B depicts a transformer coupled arc-fault detecting circuit breaker system using a detector 28 in the form of a three-winding transformer 70. The functioning of the system electrically is the same as that discussed earlier, except that the gate inputs 62a and 62b are fed from the output windings of the transformer 70, whose input winding is fed from the electrical line 24.

The present invention has been reduced to practice in the embodiments of FIGS. 2 and 3, 4A, and 4B. These embodiments operate as discussed.

These results are achieved in a circuit breaker system that is suitable for aircraft applications. The circuit breaker system does not require a separate power supply, solenoids, a microprocessor, or other components that might be used in other techniques for detecting arc faults. Alternative approaches also may be too sensitive. They may trigger the circuit breaker unnecessarily in some conditions, an unacceptable risk in aircraft where an erroneous shut-down of a critical system may result in loss of the aircraft.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An arc-fault detecting circuit-breaker system, comprising:
   a normally closed line circuit breaker connected in series by an electrical line with a protected electrical circuit element whose current flow is to be interrupted upon the occurrence of an arc fault;
   a detector of the rate of change with time of the current flow in the protected electrical circuit element; and
   a circuit-breaker activating element operable responsive to the detector, the circuit-breaker activating element being electrically connected between the electrical line and ground, the circuit breaker activating element functioning as a closed switch to establish a short to ground of the normally closed line circuit breaker and thereby opening the circuit breaker in the event that the detector detects a rate of change of current with time in the protected electrical circuit element in excess of a permitted maximum rate-of-change value.

2. The circuit-breaker system of claim 1, wherein the line circuit breaker is a resettable circuit breaker.

3. The circuit-breaker system of claim 1, wherein the detector comprises a detector of magnetic flux in the protected electrical circuit element.

4. The circuit-breaker system of claim 1, wherein the detector comprises a transformer.

5. The circuit-breaker assembly of claim 1, wherein the activating element is a silicon-controlled rectifier having a gate of the silicon-controlled rectifier in electrical communication with a detector output signal of the detector, the silicon-controlled rectifier shorting the current flow in the protected electrical circuit element in the event that the detector detects that the rate of change of current with time in the protected electrical circuit element in excess of a maximum rate-of-change value, thereby activating the line circuit breaker.

6. An arc-fault detecting circuit-breaker system, comprising:
   a normally closed line circuit breaker connected by an electrical line in series with a protected electrical circuit element whose current flow is to be interrupted upon the occurrence of an arc fault;

a detector of the rate of change with time of the current flow in the protected electrical circuit element, wherein the detector comprises
    a wire in series with the protected electrical circuit element,
    a shield overlying the wire, and
    a voltage monitor of the voltage in the shield between two locations lying along the length of the wire; and
a circuit-breaker activating element operable responsive to the detector, the circuit-breaker activating element shorting the electrical line to ground and opening the circuit breaker in the event that the detector detects a rate of change of current with time in the protected electrical circuit element in excess of a permitted maximum rate-of-change value.

7. An arc-fault detecting circuit-breaker system, comprising:
    a normally closed line circuit breaker in series with a protected electrical circuit element whose current flow is to be interrupted upon the occurrence of an arc fault;
    a detector of the rate of change with time of the current flow in the protected electrical circuit element; and
    a circuit-breaker activating element operable responsive to the detector, the circuit-breaker activating element opening the circuit breaker in the event that the detector detects a rate of change of current with time in the protected electrical circuit element in excess of a permitted maximum rate-of-change value; and
    a second circuit-breaker activating element connected in opposite polarity to the circuit-breaker activating element and operable responsive to the detector, the second circuit-breaker activating element opening the circuit breaker in the event that the detector detects a rate of change of current in the protected electrical circuit element in excess of the permitted maximum rate-of-change value.

8. The circuit-breaker system of claim 7, wherein the second circuit-breaker activating element and the circuit-breaker activating element are connected in opposite polarity.

9. An arc-fault detecting circuit-breaker system, comprising:
    a normally closed line circuit breaker in series with a protected electrical circuit element whose current flow is to be interrupted upon the occurrence of an arc fault;
    a detector of the rate of change with time of the current flow in the protected electrical circuit element, wherein the detector comprises a detector of magnetic flux in the protected electrical circuit element;
    a silicon-controlled rectifier having a gate of the silicon-controlled rectifier in electrical communication with a detector output signal of the detector, the silicon-controlled rectifier shorting the current flow in the protected electrical circuit element in the event that the detector output signals that the rate of change of current with time in the protected electrical circuit element is in excess of a permitted maximum rate-of-change value, thereby activating the line circuit breaker; and
    a second silicon-controlled rectifier connected in opposite polarity to the silicon-controlled rectifier and operable responsive to the detector, the second silicon-controlled rectifier opening the line circuit breaker in the event that the detector detects a rate of change of current in the protected electrical circuit element in excess of the permitted maximum rate-of-change value.

10. The circuit-breaker system of claim 9, wherein the detector comprises a transformer.

11. The circuit-breaker system of claim 9, wherein there is an electrical line between the line circuit breaker and the protected electrical system, and the silicon-controlled rectifier is connected between the electrical line and ground.

12. The circuit-breaker system of claim 9, wherein the second silicon-controlled rectifier and the silicon-controlled rectifier are connected in opposite polarity.

13. An arc-fault detecting circuit-breaker system, comprising:
    a normally closed line circuit breaker in series with a protected electrical circuit element whose current flow is to be interrupted upon the occurrence of an arc fault;
    a detector of the rate of change with time of the current flow in the protected electrical circuit element, wherein the detector comprises a detector of magnetic flux in the protected electrical circuit element, wherein the detector comprises
        a wire in series with the protected electrical circuit element,
        a shield overlying the wire, and
        a voltage monitor of the voltage in the shield between two locations lying along the length of the wire; and
    a silicon-controlled rectifier having a gate of the silicon-controlled rectifier in electrical communication with a detector output signal of the detector, the silicon-controlled rectifier shorting the current flow in the protected electrical circuit element to ground in the event that the detector output signals that the rate of change of current with time in the protected electrical circuit element is in excess of a permitted maximum rate-of-change value, thereby activating the line circuit breaker.

14. An arc-fault detecting circuit-breaker system, comprising:
    a normally closed line circuit breaker in series with a protected electrical circuit element whose current flow is to be interrupted upon the occurrence of an arc fault;
    a detector of the rate of change with time of the current flow in the protected electrical circuit element;
    a circuit-breaker activating element operable responsive to the detector, the circuit-breaker activating element opening the circuit breaker in the event that the detector detects a rate of change of current with time in the protected electrical circuit element in excess of a permitted maximum rate-of-change value;
    a second detector of the rate of change with time of the current flow in the protected electrical circuit element; and
    a second circuit-breaker activating element operable responsive to the second detector, the second circuit-breaker activating element opening the circuit breaker in the event that the second detector detects a rate of change of current in the protected electrical circuit element in excess of the permitted maximum rate-of-change value.

15. The circuit-breaker system of claim 14, wherein the second circuit-breaker activating element and the circuit-breaker activating element are connected in opposite polarity.

16. An arc-fault detecting circuit-breaker system, comprising:
    a normally closed line circuit breaker in series with a protected electrical circuit element whose current flow is to be interrupted upon the occurrence of an arc fault;
    a detector of the rate of change with time of the current flow in the protected electrical circuit element, wherein the detector comprises a detector of magnetic flux in the protected electrical circuit element;

a silicon-controlled rectifier having a gate of the silicon-controlled rectifier in electrical communication with a detector output signal of the detector, the silicon-controlled rectifier shorting the current flow in the protected electrical circuit element in the event that the detector output signals that the rate of change of current with time in the protected electrical circuit element is in excess of a permitted maximum rate-of change value, thereby activating the line circuit breaker;

a second detector of the rate of change with time of the current flow in the protected electrical circuit element, wherein the second detector comprises a detector of magnetic flux in the protected electrical circuit element; and a second silicon-controlled rectifier operable responsive to the second detector, the second silicon-controlled rectifier opening the circuit breaker in the event that the second detector detects a rate of change of current in the protected electrical circuit element in excess of the permitted maximum rate-of-change value.

17. The circuit-breaker system of claim 16, wherein the second silicon-controlled rectifier and the silicon-controlled rectifier are connected in opposite polarity.

18. An arc-fault detecting circuit-breaker system, comprising:

a normally closed line circuit breaker in series with a protected electrical circuit element whose current flow is to be interrupted upon the occurrence of an arc fault;

a detector of the rate of change with time of the current flow in the protected electrical circuit element, wherein the detector comprises a transformer;

a silicon-controlled rectifier having a gate of the silicon-controlled rectifier in electrical communication with a detector output signal of the detector, the silicon-controlled rectifier shorting the current flow in the protected electrical circuit element in the event that the detector output signals that the rate of change of current with time in the protected electrical circuit element is in excess of a permitted maximum rate-of-change value, thereby activating the line circuit breaker; and a second silicon-controlled rectifier connected in opposite polarity to the silicon-controlled rectifier and operable responsive to the detector, the second silicon-controlled rectifier shorting the current flow in the protected electrical circuit element in the event that the detector output signals that the rate of change of current with time in the protected electrical circuit element is in excess of a permitted maximum rate-of-change value, thereby activating the line circuit breaker.

* * * * *